United States Patent [19]

Faine

[11] 4,180,289
[45] Dec. 25, 1979

[54] GARDENING TOOL

[76] Inventor: Eric N. Faine, 63 Hill St., Northgate, Australia

[21] Appl. No.: 920,063

[22] Filed: Jun. 28, 1978

[30] Foreign Application Priority Data

Oct. 6, 1977 [AU] Australia .............................. 1963/77

[51] Int. Cl.² ................................................ A01B 1/00
[52] U.S. Cl. ..................................... 294/53.5; 294/60
[58] Field of Search .................... 294/53.5, 51, 60, 49, 294/50.9

[56] References Cited

U.S. PATENT DOCUMENTS

| | | | |
|---|---|---|---|
| 1,513,179 | 10/1924 | Monica | 294/60 |
| 1,741,004 | 12/1929 | Wornstaff | 294/53.5 |
| 2,247,958 | 7/1941 | Maxcy | 294/60 |

Primary Examiner—James B. Marbert
Attorney, Agent, or Firm—Donald D. Jeffery

[57] ABSTRACT

A gardening tool has a straight handle and a tool head, such as a spade blade, gardening fork or weeding fork, pivoted to its lower end about a transverse axis, stops limiting the pivotal movement of the tool head in one direction beyond normal working position, aligned with the handle, and in the other direction beyond a second position at an obtuse angle to the handle. A spring biases the tool head to working position and a pedal at the lower part of the tool enables foot pressure to be applied to the tool head. A catch may be provided to hold the tool head releasably in its second position, and the tool head may be interchangeable with others.

3 Claims, 4 Drawing Figures

GARDENING TOOL

BACKGROUND OF THE INVENTION

This invention relates to an improved gardening tool.

Many people find that the stooping and bending motions required when using a garden spade, fork, weeder or the like are likely to cause great strain on their backs and consequent muscular pain.

The present invention has been devised with the general object of providing a gardening tool such as a garden spade, fork or weeder, which is of such novel and improved construction that it may be easily and conveniently used without causing undue back strain.

SUMMARY OF THE INVENTION

Accordingly, the invention resides broadly in a gardening tool including a substantially straight and normally upright handle; a tool head; means for connecting the tool head to the handle pivotally about an axis transverse with respect to the handle and tool head; means for restricting pivotal movement of the tool head, in one direction beyond a first position in which the tool head is substantially in alignment with the handle, and in the other direction beyond a second position in which the tool head is at an angle to the handle; a spring biasing the tool head to the said first position; and a pedal connected to the normally lower end of the handle for transferring foot pressure to the tool head. Other features of the invention will become apparent from the following description.

DESCRIPTION OF THE PREFERRED EMBODIMENTS

Figure 1:
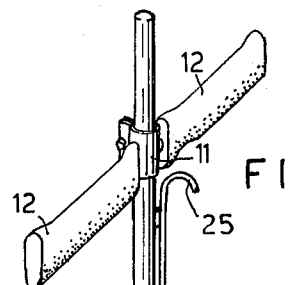
FIG. 1 is a perspective view of a spade according to the invention, in normal digging position.
Figure 2:
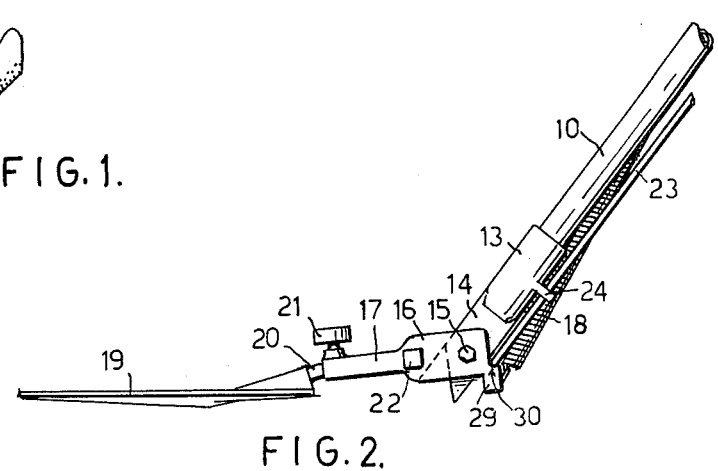
FIG. 2 is a side view of part of the spade with its blade in position for lifting and carrying soil.

Referring initially to FIGS. 1 and 2 of the drawings, the spade illustrated includes a tubular metal handle 10 on which a clamp sleeve 11 is adjustably secured, this sleeve having a pair of opposed hand grips 12 secured to and extending from it, one to the front, the other to the back. The hand grips are such that when the handle 10 is vertical, the front hand grip inclines downwardly, and the rear one inclines upwardly, from the sleeve.

On the lower end of the handle 10 there is secured an end piece 13 with an integral downwardly extending lug 14 which is pivoted, by a bolt 15, between the parallel arms of a bifurcated member 16 terminating at its lower end in a square-section socket 17. The extremity of the lug 14, and the division between the arms of the bifurcated member 16, are such that the bifurcated member and its socket 17 may be swung pivotally back, relative to the handle 10, until in alignment with the handle, as shown in FIG. 1 or alternatively may be swung pivotally forwards relative to the handle 10 until at an obtuse angle thereto, as shown in FIG. 2, but may not be pivoted in either direction beyond these two positions. A tension spring 18 connected between the bifurcated member 16 and the handle 10 biases the bifurcated member to its position in alignment with the handle 10.

A spade blade 19 has a central upwardly extending square-section spigot 20 which is closely engaged slidably in the socket 17, and is releasably retained therein by a setscrew 21.

A pedal bar 22 is rigidly secured to, and extends laterally from, the bifurcated member 16.

A locking rod 23 is slidable through apertured brackets 24 on the handle 10 and on the end piece 13, this rod consisting of an upper part shaped at its upper end to form a finger-piece 25, and a lower part having at its upper end a collar 26 through which the lower end of the upper part of the locking rod passes, and in which it is held by a set-screw 27. A helical compression spring 28 on the locking rod between the collar 26 and an apertured bracket 24 urges the locking rod downwardly. When the spade blade 19 is in normal digging position as shown in FIG. 1, the lower end of the locking rod 23 bears on a lug 29 extending rearwardly from the top of the bifurcated member 16, and when the spade blade is swung to its carrying position, as shown in FIG. 2, the lower end of the locking bar engages in a notch at 30 in the bifurcated member, to prevent the spade blade from returning to digging position until the locking bar is raised, by moving the finger piece 25 upwards against the action of the compression spring 28.

In use, the spade is used for digging by grasping the hand grips 12 to bring the handle 10 more or less vertical, and by applying foot pressure to the pedal bar 22. To carry soil, the top of the handle 10 is moved forwards relative to the spade blade until the locking bar 23 engages in the notch 30. With the handle 10 held to incline downwardly towards the front, as shown in FIG. 2, the spade blade will be held horizontal. To return the spade blade 19 to digging position, it is necessary only to lift the locking rod 23 by its finger piece 25, whereupon the spring 18 will swing the blade to the required position. The spade may thus be used to lift and carry soil without the user having to bend over, and the arrangement of the hand grips 12 will be found to facilitate greatly the lifting and carrying of soil without undue strain.

By unscrewing the set-screw 21, the spade blade 19 may be removed and replaced by a gardening fork or other tool with a spigot similar to the spade spigot 20.

Figure 3:
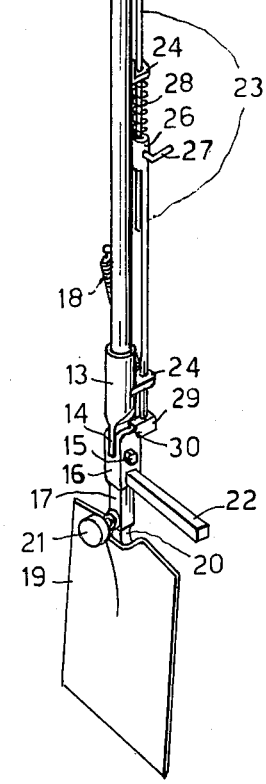
FIG. 3 is a partly broken-away perspective view of a weeder according to the invention in normal position for being driven into the soil.
Figure 3:
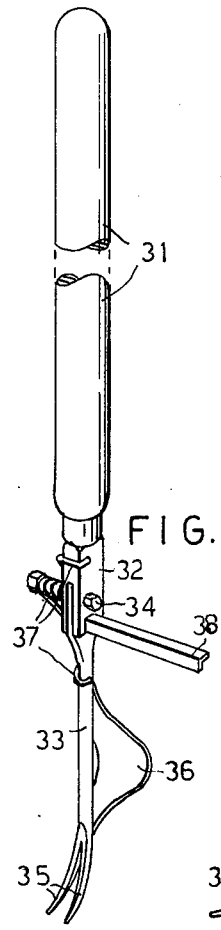
Figure 4:
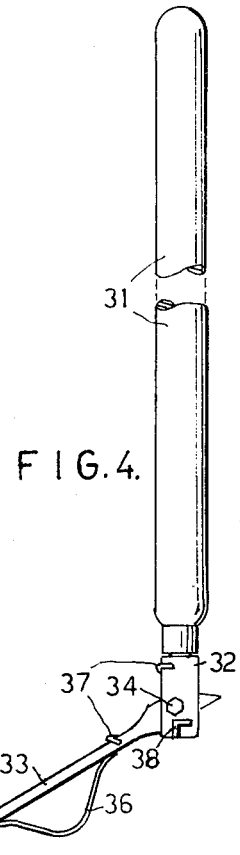
FIG. 4 is a partly broken-away side elevation of the weeder in its weed-lifting position.

The weeder shown in FIGS. 3 and 4, to which reference is now made, has a fairly long handle 31 with a bifurcated member 32 fixed to its lower end. Between the arms of this bifurcated member the upper end of a weeding fork 33 is pivoted by a bolt 34. The weeding fork is of well-known type with a pair of curved divergent points 35 and a curved sheet metal fulcrum member 36, the weeding fork being used by inserting its two points 35 into the soil near to a weed, which is then levered from the ground by moving the top of the fork back to roll on the fulcrum member, the points holding the root of the weed between them.

The top end of the weeding fork 33, and the division between the arms of the bifurcated member 32, are such that the weeder fork cannot be pivoted back, relative to the handle 31, beyond the position shown in FIG. 3, in which the shank of the fork is aligned with the handle, and it cannot be pivoted forward beyond the position shown in FIG. 4, in which the weeding fork shank is at an obtuse angle to the handle 31. The weeding fork is biased to the digging position shown in FIG. 3 by a torsion spring 37 wound about a part of the bolt 34 and with its ends hooked to the bifurcated member 32 and to the shank of the weeding fork.

A pedal bar 38 is rigidly secured to, and extends laterally from, the bifurcated member 32.

To use the weeder, the handle 31 is held upright and the weeding fork is positioned close to a weed to be extracted, the fork then being driven into the soil by foot pressure on the pedal bar 38. By moving the pedal bar back and/or by moving the top of the handle 31 forward, the fork and handle are brought pivotally out of alignment, and by downward pressure on the handle, the fork may be rolled on its fulcrum member 36 to the position shown in FIG. 4, so as to lever the weed from the soil. When the handle is raised, the weeding fork will be returned to its original position by the spring 37.

I claim:

1. A gardening tool having a substantially straight and normally upright handle, a pedal connected to the normally lower end of the handle, a tool head, pivot means interconnecting said handle and the tool head whereby the tool head may be pivoted about an axis transverse with respect to said handle and tool head, and a torsion spring having a first part thereof fixed to the handle and a second part thereof fixed to the tool head with an intermediate part associated with the pivot means, the interconnection between the tool head and the handle by said pivot means being such that the tool head cannot be pivoted past a first position wherein the handle is in substantial alignment with the tool head and a second position wherein the tool head is at an obtuse angle to said handle, said torsion spring urging said handle toward the first position.

2. A gardening tool as claimed in claim 1 wherein there is provided a bifurcated member at the normally lower end of the handle, said bifurcated member and said tool head in the upper region thereof being formed with aligned apertures, and said pivot means comprises a pivot bolt passing through said aligned aperatures, the intermediate part of the torsion spring being coiled around a lateral extension of said pivot bolt.

3. A gardening tool as claimed in claim 1 where the tool head is a weeding fork, comprising curved spaced points which extend into the ground adjacent the weed, and a curved fulcrum member attached to the rear of said tool head, said fulcrum facilitating rolling movement of said tool head from said first to said second position for removing the weed.

* * * * *